(12) United States Patent
Fear (10) Patent No.: US 8,943,559 B2
(45) Date of Patent: Jan. 27, 2015

(54) ACCESS AUTHENTICATION METHOD AND SYSTEM

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 91 days.

(21) Appl. No.: 13/790,566

(22) Filed: Mar. 8, 2013

(65) Prior Publication Data

US 2014/0259128 A1    Sep. 11, 2014

(51) Int. Cl.
*G06F 21/31* (2013.01)
*H04L 29/06* (2006.01)

(52) U.S. Cl.
CPC ..................................... *H04L 63/08* (2013.01)
USPC .............. 726/4; 726/2; 726/3; 726/5; 726/16; 726/17; 726/21

(58) Field of Classification Search
None
See application file for complete search history.

(56) References Cited

U.S. PATENT DOCUMENTS

| | | | |
|---|---|---|---|
| 2003/0179913 A1* | 9/2003 | Murase et al. | 382/119 |
| 2005/0229009 A1* | 10/2005 | Fujii et al. | 713/186 |
| 2007/0236330 A1* | 10/2007 | Cho et al. | 340/5.54 |
| 2008/0113791 A1* | 5/2008 | Williams et al. | 463/29 |
| 2012/0013724 A1* | 1/2012 | McNulty | 348/77 |
| 2012/0054057 A1* | 3/2012 | O'Connell et al. | 705/26.1 |
| 2012/0167170 A1* | 6/2012 | Shi et al. | 726/2 |
| 2012/0234058 A1* | 9/2012 | Neil et al. | 70/91 |
| 2013/0347099 A1* | 12/2013 | Smith | 726/19 |

* cited by examiner

*Primary Examiner* — Kaveh Abrishamkar
*Assistant Examiner* — Adrian Stoica (57) ABSTRACT

A method of authenticating access to an electrical device. The method comprises comparing, at an electronic processor, one or more patterns of temporal or physical properties, associated with an access entry string, to a non-transitory electronic profile data base of ranges of the corresponding patterns, from previously approved access entry strings. The method also comprises approving or denying at the electronic processor, the access entry string. The access entry string is approved if the one or more patterns falls within the respective range of the corresponding patterns in the profile data base. The access entry string is denied if the one or more patterns falls outside the respective range of the corresponding patterns in the profile data base.

20 Claims, 4 Drawing Sheets

ACCESS AUTHENTICATION METHOD AND SYSTEM

TECHNICAL FIELD

This application is directed, in general, to access authentication and, more specifically, to methods, systems and tools of authenticating of a user-supplied access entry string.

BACKGROUND

Many electrical devices have their access control governed by the correct entry of a user name and/or password which are based on a string of symbols, referred to herein as an access entry string. Such devices can include, without limitation, mobile communication devices, computers, including servers hosting websites, such as commercial or government website, or security devices, such as electronic door lock or alarm system. As increasing amount of confidential information because digitized, there is increased risk that hackers can gain access to such information. Unauthorized access can be gained by hacking the user name and/or password, e.g., by guessing, observing or recording the corresponding entry string while it is supplied by an authorized user. For instance, malicious software installed on an electrical device can track and record passwords entries and then an unauthorized user can use the recorded entries to gain access to the electrical device. There is a need to deter such unauthorized access.

SUMMARY

One embodiment is a method of authenticating access to an electrical device. The method comprises comparing, at an electronic processor, one or more patterns of temporal or physical properties, associated with an access entry string, to a non-transitory electronic profile data base of ranges of the corresponding patterns, from previously approved access entry strings. The method also comprises approving or denying at the electronic processor, the access entry string. The access entry string is approved if the one or more patterns falls within the respective range of the corresponding patterns in the profile data base. The access entry string is denied if the one or more patterns falls outside the respective range of the corresponding patterns in the profile data base.

One embodiment is a system for authenticating access to an electrical device. The system comprises an electronic processor configured to compare one or more patterns of temporal or physical properties, associated with an access entry string, to a non-transitory electronic profile data base of ranges of the corresponding patterns, recorded from previously approved access entry strings. The electronic processor is configured to approve the access entry string if the one or more patterns falls within the respective range of the corresponding patterns in the profile data base. The electronic processor is configured to deny the access entry string if the one or more patterns falls outside the respective range of the corresponding patterns in the profile data base.

One embodiment is access authentication tool. The tool comprises a non-transitory electronic processor-readable medium for embodying a program for inputting to an electronic processor. The tool comprises a program embodied in the electronic processor-readable medium for causing the electronic processor to implement an access authentication program, including the above-described method steps.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present invention benefit from the recognition that there are unique patterns of temporal or physical properties associated with and uniquely identifiable to a user's input of an access entry string. These patterns of temporal or physical properties can provide an additional measure of security to authenticate the identity of the user attempting to access an electrical device. Thus, even if a hacker has stolen an access entry string (e.g., a username and password) the hacker may still not gain access to the device. Access can be denied because the pattern of temporal or physical properties associated with the hacker's input of the user name and password does not match the ranges of the corresponding patterns of the one or more temporal or physical properties from previously authorized entry sequences by the approved user.

Figure 1:
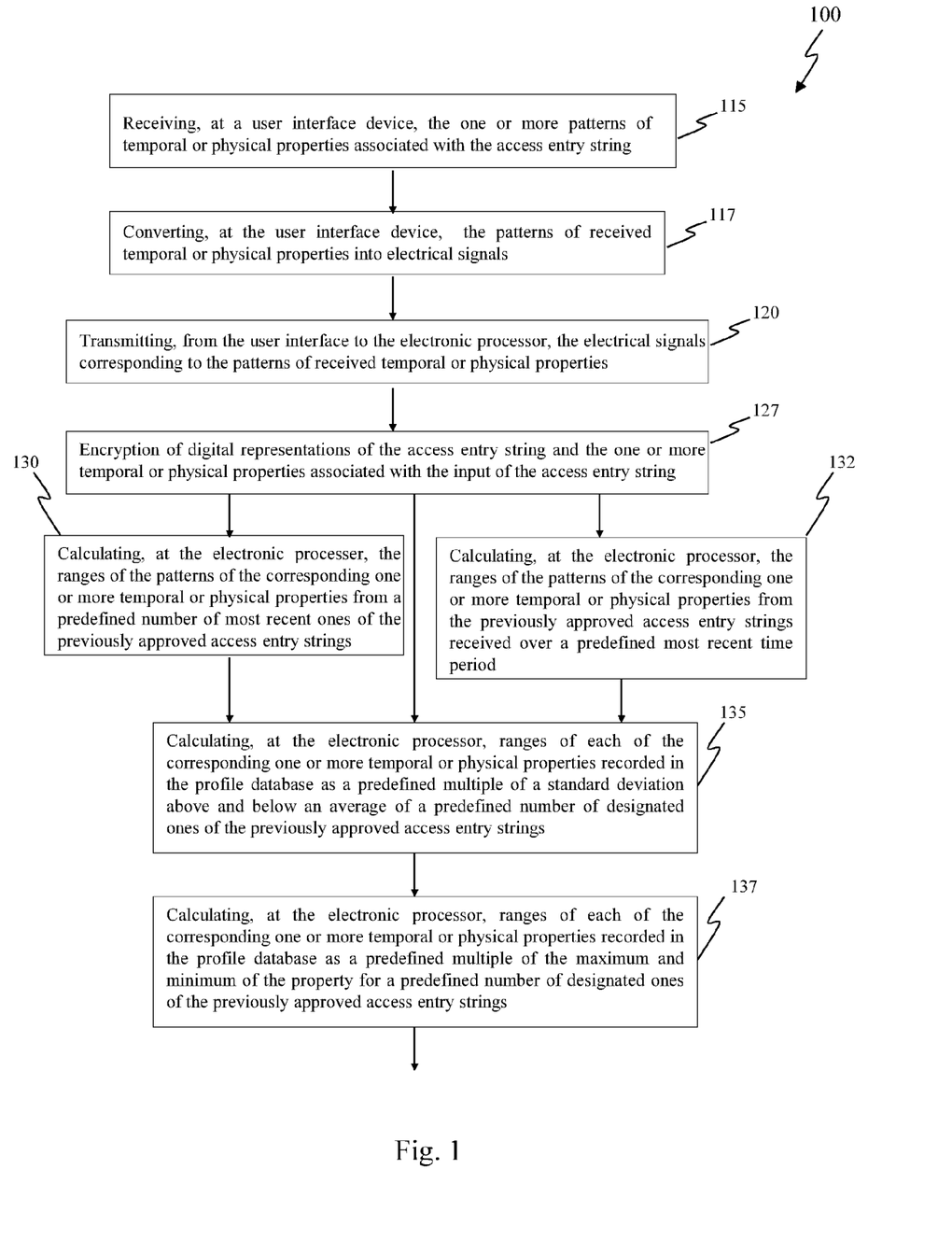
FIG. 1 illustrates a flow diagram of an embodiment of a method of authenticating access to an electrical device according to the principles of the present disclosure.
Figure 2:
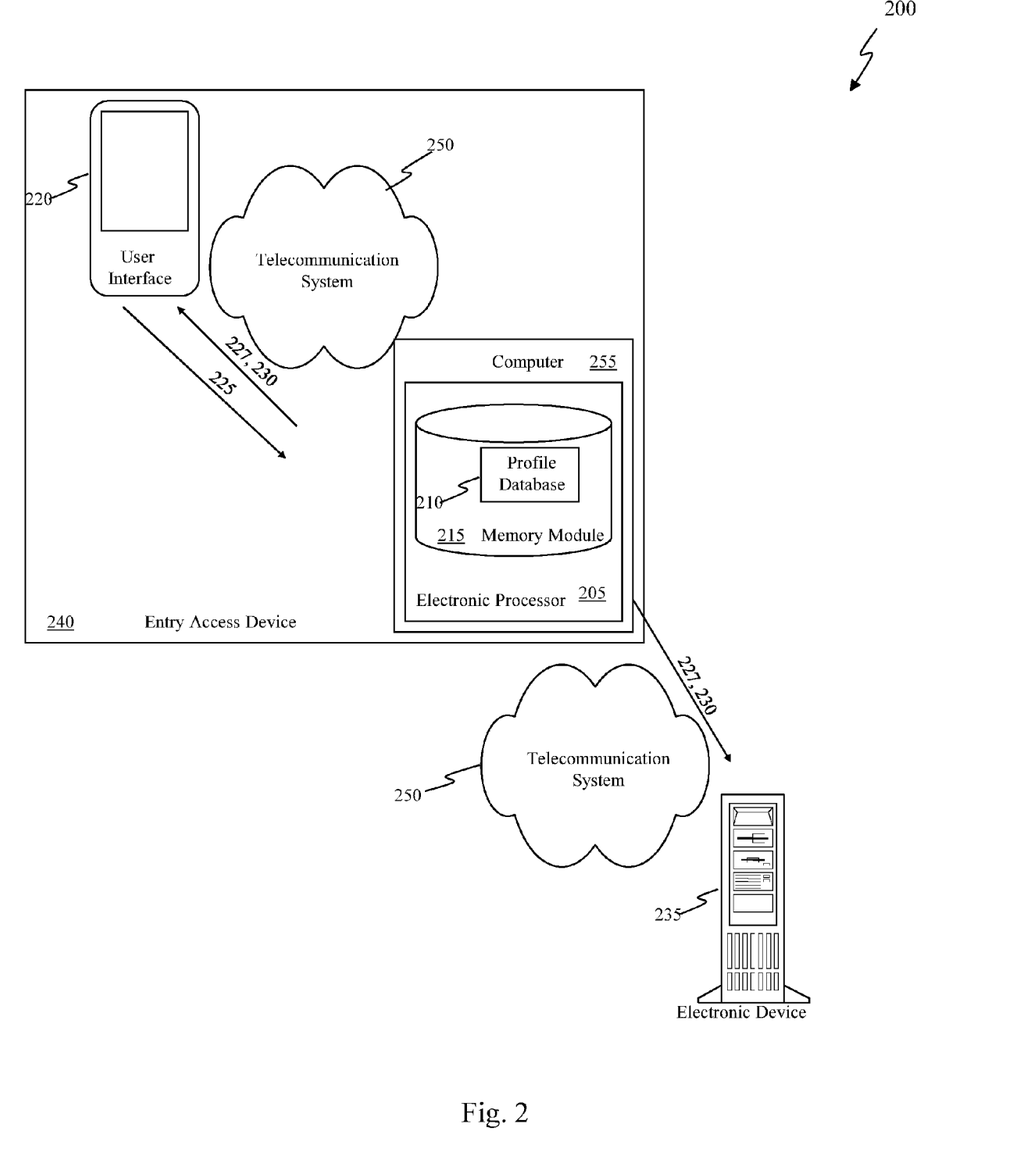
FIG. 2 illustrates a block diagram of various embodiments of a system for authenticating access to an electrical device constructed according to the principles of the present disclosure.

One embodiment is a method of authenticating access to an electrical device. FIG. 1 illustrates a flow diagram of an embodiment of a method 100 of authenticating access to an electrical device according to the principles of the present disclosure. FIG. 2 illustrates a block diagram of various embodiments of a system 200 for authenticating access to an electrical device constructed according to the principles of the present disclosure.

With continuing reference to FIGS. 1 and 2, the method 100, comprises a step 105 of comparing, at an electronic processor 205, one or more patterns of temporal or physical properties, associated with an access entry string, to a non-transitory electronic profile data base 210 of ranges of the corresponding patterns, from previously approved access entry strings. The method 100 further comprises either a step 107 of approving the access entry string or a step 110 of denying the access entry string, at the electronic processor. The access entry string is approved, in step 107, if the one or more patterns falls within the respective range of the corresponding patterns in the profile data base 210. The access entry string is denied, in step 110, if the one or more patterns falls outside the respective range of the corresponding patterns in the profile data base 210.

As used herein the term, access entry string, as used herein refers to any characteristic pattern provided by a user seeking access to an electrical device. In some cases, the access entry string can refer to a characteristic string of symbols, e.g., alphanumeric characters of shapes, provided by a user seeking access to an electrical device. As non-limiting example, a user may input an access entry string as a string of symbols. As a further non-limiting example, a user may input an access entry string as a shape, sometimes referred to as a swipe pattern, drawn on a touch sensitive screen (e.g., a shape drawn across a grid of dots displayed on a touch sensitive screen). Again, with limitation, in some cases the access entry string of symbols is inputted with the user's own digits (e.g., one or more fingers) while in other cases, the access entry string is inputted by the user with the aid of a writing or drawing tool such as a stylus. In other cases, the access entry string can refer to a characteristic biometric identifier, such as, but not limited to, the characteristic patterns of a user's, facial features, fingerprint, iris, or retinal blood vessel network. In some such cases, the access entry string is inputted by the user by standing in front or touching the appropriate scanning components of a user interface.

The term electronic processor 205, as used herein, refers to one or more electronic circuits configured to execute commands in a series of electronic instruction, e.g., embodying a program to implement the method of authentication. The electronic processor 205 can include a central processing unit of a computing device such as a general purpose computer, server computer. The electronic processor can include one or more integrated circuit chips, such as a system-on-chip (e.g., without limitation, an NVIDIA TEGRA system-on-chip), configured to carry out the instructions of the computer program to implement the method of password authentication. The system-on-chip can be part of a mobile communication device, or an electronic security system, such as an electronic door lock, automated bank teller, or the circuit board or other electrical device of a security system located in a building, vehicle, or other machines.

The electronic processor 205 can include a memory module 215 configured to store the non-transitory electronic profile data base 210 of the ranges of corresponding patterns. Non limiting examples of the memory module 215 include RAM (e.g. SRAM, SDRAM, DDR RAM, etc.), non-volatile memory (e.g. ROM, EEPROM, Flash Memory, etc.), contain hard drives, flash memory, or removable storage drives (e.g., thumb drives, Secure Digital cards).

The term profile data base 210 as used herein refers to non-transient electrically stored tables of ranges of the corresponding patterns for the user associated with the access entry string. For instance, in some embodiments, the access entry string can be one or both of a username or password, e.g., assigned to an approved user. There can be temporal or physical properties associated with one or both the access entry string for the username or password. As further explained herein the temporal or physical properties can be recorded and stored in the profile data base 210 for that user and used to generate the ranges for the patterns of such temporal or physical properties, which are also stored in the profile data base 210.

The term electrical device as used herein refers to any machine whose function is at least partially powered by electricity; non-limiting examples include mobile communication devices (cell phones, tablets, smart phones) computers (e.g., personnel computers, server computers), electronic locks or security systems or others devices that includes similar electrical components.

Returning to FIG. 1, some embodiments of the method 100 further include a step 115 of receiving, at a user interface device 220, the one or more patterns of temporal or physical properties associated with the access entry string.

As used herein, the term user interface device 220 refers to any machine-human interface that can be configured to receive the pattern of one or more temporal or physical properties associated with the access entry string. Non-limiting examples are devices which include a keyboard, keypad, touch screen, mouse, or virtual screen representations thereof or biometric scanning devices.

Some embodiments of the method 100 further include a step 117 of converting, at the user interface device 220, the patterns of received temporal or physical properties into electrical signals 225. Some embodiments of the method 100 further include a step 120 of transmitting, from the user interface 220 to the electronic processor 205, the electrical signals 225 (or equivalents) corresponding to the patterns of received temporal or physical properties.

Some embodiments of the method 100 further include a step 122 of sending an approved access signal 227 (if step 107 applies) or a step 125 of a denied access signal 230 (if step 110 applies). Either one of the approved access signal 227, or denied access signal 230, is sent from the electronic processor 205, to one or both of a user interface device 220 where the access entry string was inputted, or, to an electrical device 235 for which access is sought.

The approved access signal 227 is configured to give the user access to the electrical device 235. In some cases, the approved access signal 227 sent in step 122 is configured to prompt the user interface device 220 to provide an approval indicator (e.g., via a display screen or speakers of the user interface) and/or prompt the user to access the electrical device 235.

The denied access signal 230 is configured to deny the user access to the electrical device 235. In some cases, denied access is a default state and the denied access signal 230 simply does not change this state. In some cases, the denied access signal 230 sent in step 125 is configured to provide a denied indicator (e.g., via a display screen or speakers of the user interface device 220).

In some cases, as part of step 125, the denied access signal 230 includes instructions to the user interface device 220 to prompt for additional security information to be supplied. For example, without out limitation, the user interface device 220 may prompt for the entry of additional security or personnel information previously supplied by the approved user (e.g., date of birth, maiden name etc. . . . ), or, prompt the user to call a telephone number where such information is verified. This can advantageously permit an allowed user to gain authorization, even when the inputted patterns do not fall within the ranges of the corresponding patterns in the profile data base, e.g., because the user inputs the access entry string with an injured hand or their other non-dominant hand.

The temporal or physical properties can be any number of attributes that are characteristic to a particular user's pattern of entering the access entry string (e.g., received by the user interface device 220 as part of step 115).

For instance, in some embodiments, one of the temporal properties includes a total time or an average time to input all or a portion of the access entry string, e.g., as string of symbols. For example, the temporal property can be a total time to the total time to input an eight character username or password, or the total time to enter the first four characters of a longer username or password. Or, the temporal property can be total time to input all or part of a swipe pattern. For instance, in some embodiments, another one of the temporal properties can be the cadence of entering all or part of the access entry string, e.g., as quantified by the pauses or delay times between the entry of successive characters or swipe strokes of the access entry string.

For instance, in some embodiments, one of the physical properties includes a total or average fingertip pressure applied while inputting all or a portion the access entry string. For example the physical property can be the total fingertip pressures (e.g., in Newton's per unit area) to input the eight character username or password, or, a swipe pattern, or, a fingerprint. Or, another physical property can be differences in fingertip pressures or cadence of fingertip pressures associated with inputting all or a portion the access entry string. In some cases instead of a specific pressure reading, the fingertip pressure can be grouped into a categorical index of pressures, such as light, medium and heavy.

For instance, in some embodiments, one of the physical properties includes an average fingertip temperature while inputting all or a portion the access entry string. For example, the keyboard, keypad or touch screen of a user interface device 220 can be configured to measure the fingertip temperature.

For instance, in other embodiments, one of the physical properties includes an ambient temperature in the vicinity of the geolocation and at the time the access entry string was provided. In some cases, the ambient temperature can be directly measured by a suitably configured user interface device 220. In other cases, the temperature can be determined from a lookup table of temperatures based on the geo-location of the user interface device 220 and time of input of the access entry string. For instance, the user interface device 220 can include a global positioning system GPS processer (e.g., without limitation, a Gforce GPS) and configured to lookup an ambient temperature at the location and time of the access entry string entry. The ambient temperature can be compared to a range of the ambient temperature in the profile data base 210 of ranges of the corresponding patterns of ambient temperatures normally associated with the previous previously approved access entry strings.

In some cases the ambient temperature can be used to select among different profile data bases of fingertip temperatures, e.g., to adjust for access entry strings entered in different ambient environments which would affect the fingertip temperature.

In some embodiments of the method 100, the user can select and define the particular types of temporal or physical properties and the patterns, e.g., to personalize and thereby increase the level of security for verifying authentication.

As a non-limiting example, consider one authorized user (user A) inputting the access entry string as a password, "nvidia3D," in a total time of eight seconds and average fingertip pressure index of light or a numerical equivalent (e.g., a scales of 1 of a three scale categorical index from 1 to 3 corresponding to light, medium and heavy, respectively), and average fingertip temperature of 98.0° F. User A's patterns of temporal and physical properties may be defined as the sequence of total time, average pressure and average temperature (e.g., 8, 1, and 98.0) or an arithmetic combination thereof (e.g., 8×1×98.0).

A second unauthorized user or hacker (user B) with knowledge of the password "nvidia3D" may input the password in 16 seconds with medium pressure and fingertip temperature of 98.2° F. In some embodiments, the fingertip temperature 98.2 may be within the range for this property in the profile data base 210, but one or both the total time and average fingertip pressure are not within their respective ranges. Such cases user B is still denied authorization.

Alternatively, user A and B may both be authorized users sharing a same password that limits access to two different electrical devices (e.g., two mobile communication devices or computers shared by two family members or co-workers). However, separate profiles of the patterns of temporal and physical properties associated with user A and user B would provide an extra deterrent to unauthorized access by a hacker with knowledge of the password and potential access to both electrical devices.

In some embodiments of the method 100 it is desirable to provide a secure communication pathway between the electronic processor 205 and other devices (e.g., a user interface device 220 or electrical device 235 remotely located from the processor 205) that the processor 205 may transmit and receive signals to and from.

For instance, in some embodiments, as part of any or all of steps 120, 122, 125 the electronic processor 205 receives or sends in step 127, e.g., a key exchange identifier which includes an encryption of digital representations of the access entry string and the one or more temporal or physical properties associated with the input of the access entry string.

As a non-limiting example, consider an access entry string corresponding to the username or password, "abc," and the associated temporal and physical properties are the total time to enter the string, equal to 3 seconds, and the average finger tip temperature during entry of the string, equal to 78° F. The characters of the username or password can be converted, e.g., at the user interface device 220, into a numeric value of 6 (e.g., a=1, b=2, c=3) and this number value can be combined as product with the temporal and physical properties to create a key exchange identifier of 1404 for the authorized user (e.g., 6×3×78). The electronic processor 205 can be configured to accept the electrical signal 225 transmitted from the user interface device 220 in step 120 when the electrical signal 225 includes the key exchange identifier of 1404.

The user interface device 220 and/or electrical device 235 can be similarly configured. For instance, the interface device 220 and/or electrical device 235 can be configured to accept the approval signal 227 or denied signal 230 sent from the processor 205 in steps 122 and 125, respectively, when the signals 227, 230 include the key exchange identifier of 1404. Based upon the present disclosure, one of ordinary skill in the pertinent arts would appreciate that many different algorithms can be used to generate key exchange identifier, or other encrypted identifiers, based on digital representations of the access entry string and the one or more temporal or physical properties.

In some embodiments, it is preferable to configure the electronic processor 205 to heuristically track and update the ranges of the patterns in the profile data base 210 for each authorized user. Heuristic tracking and updating allows for changes in the physical characteristic of the user inputting the access entry string over time or in different ambient environments (e.g., summer, fall, winter and spring, or different cities, different weather conditions etc. . . . ).

For instance, as illustrated in FIG. 1, some embodiments of the method 100 include a step 130 of calculating, at the electronic processor 205, the ranges of the patterns of the corresponding one or more temporal or physical properties from a predefined number of most recent ones of the previously approved access entry strings. As a non-limiting example, the 10 most recent inputted access entry strings, which were approved in step 107, can be used to calculate the ranges of the patterns.

For instance, as illustrated in FIG. 1, some embodiments of the method 100 include a step 132 of calculating, at the electronic processor 205, the ranges of the patterns of the corresponding one or more temporal or physical properties from the previously approved access entry strings received over a predefined most recent time period. As a non-limiting example, the access entry strings approved in step 107 over the last 10 days or 2 months can be used to calculate the ranges of the patterns.

Heuristic tracking and updating of the ranges of the patterns to update the profile date base can be done continuously or periodically. For instance, the processor 205 can be configured to implement method steps 130 or 132 continuously, or after every 100 or 1000 inputs of the access entry string or after the elapse of 10 or 100 days of time since the last heuristic tracking and update.

The ranges of the patterns of the corresponding one or more temporal or physical can be calculated by looking back to previous inputs of the access entry string or to inputs provided in a training session, e.g., when the method 100 is first implemented.

For instance, as illustrated in FIG. 1, some embodiments of the method 100 include a step 135 of calculating, at the electronic processor 205, ranges of each of the corresponding one or more temporal or physical properties recorded in the profile database as a predefined multiple of a standard deviation above and below an average of a predefined number of designated ones of the previously approved access entry strings. As a non-limiting example, in some cases the range of a particular temporal or physical property can be defined as a 2, 3, 4 or 5 times multiple of the standard deviation above and below an average of the property associated with a predefined number of approved access entry strings (e.g., most recent 10 inputs or inputs over the last 10 days).

Some embodiments the method 100 can additionally or alternatively include a step 137 of calculating, at the electronic processor 205, ranges of each of the corresponding one or more temporal or physical properties recorded in the profile database as a predefined multiple of the maximum and minimum of the property for a predefined number of designated ones of the previously approved access entry strings. Based upon the present disclosure one of ordinary skill in the pertinent arts would appreciate that there could be other methods to calculate the ranges of the temporal or physical properties.

As illustrated in FIG. 1, some embodiments of the method 100 can further include a step 140 of storing, at the profile data base 210, the ranges of the temporal or physical properties calculated in any or all of steps 130, 132, 135, 137.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

As noted in the context of FIG. 2, and with continuing reference to FIG. 1, another embodiment is a system 200 for authenticating access to an electrical device. The system 200 comprises an electronic processor 205, configured to carry out steps 105, 107 and 110. That is, the processor 205 is configured to compare one or more patterns of temporal or physical properties, associated with an access entry string, to a non-transitory electronic profile data base 210 of ranges of the corresponding patterns, recorded from previously approved access entry strings. The processor 205 is configured to perform either of approve the access entry string or denying the access entry string in accordance with steps 107 and 110, respectively.

In various embodiments of the system 200, the processor 205 can be configured to implement any of all of steps 122-140 as discussed in the context of FIG. 1.

Some embodiments the system 200 further includes a user interface device 220, e.g., configured to implement any or all of steps 110-117. For instance, the user interface device 220 can receive the one or more patterns of temporal or physical properties associated with the access entry string. The user interface device 220 can convert the received patterns of temporal or physical properties into electrical signals 225, transmit the electrical signals to the electronic processor.

For instance, embodiments of the user interface device 220 can include pressure sensors or temperature sensors configured to receive and convert the temporal or physical properties into the electrical signals 225. In some embodiments, the software and hardware on existing devices (e.g., certain smart phones or tablets), can be programmed to take an inputted access entry string an record and covert one or more associated temporal or physical properties (e.g., the total time or cadence or fingertip pressure) into the electrical signals 225 transmitted to the processor 205.

Embodiments of the user interface device 220 can be further configured to present an approval indicator upon receiving an electrical approval signal 227 sent from the electronic processor 205 if access is approved by the electronic processor in step 107, or, present a denial indicator upon receiving an electrical denial signal 230 sent from the electronic processor 205 if access is denied by the electronic processor 205 in step 110.

Some embodiments the system 200 further includes an electrical device, e.g., the electrical device 235 for which access is sought. For instance, the electrical device 235 can be configured to allow user access upon receiving an approval signal 227 sent from the electronic processor 205 if access is approved by the electronic processor in step 107. Or, the electrical device 235 can be configured to deny user access upon receiving a denial signal 230 sent from the electronic processor 205 if access is denied by the electronic processor 205 in step 110.

In some embodiments, as illustrated in FIG. 2, the user interface device 220 and the electronic processor 205 are part of a same entry access device 240, and in some cases, the entry access device 240 is part of the electrical device 235 for which authorized access is sought. As non-limiting examples, in some cases, the entry access device 240 can be a mobile communication device (e.g., smart phone, cell phone, tablet, laptop computer) that includes the electronic processor 205 (e.g., a system-on-chip) and the user interface device 220 (e.g., a touch screen or keypad).

In some cases, the access entry device 240 and the electrical device 235 are one in the same. For instance, the method 100 and system 200 can be implemented on a mobile communication device 235 the user wishes to access. In other cases the access entry device 240 and the electrical device 235 are physically separated. For instance, the entry access device 240 can be a mobile communication device that implements the method and system 200 to gain access to an electrical device 235 embodied as an automobile, computer server (e.g., hosting banking software) or an electronic lock.

In some embodiments, as illustrated in FIG. 2, the user interface device 220 can be remotely connected to the electronic processor 205 via a telecommunication system 250. As a non-limiting example, the user interface device 220 can be a mobile communication device that is remotely connected to electronic processor 205 which can be part of a computer (e.g., a server computer which host banking software). The exchange of electrical signals 225, 227, 230 can occur through the telecommunication system 250 via radio waves (e.g., implemented on a local area network) or via global or regional telephone, satellite or cellular telecommunication networks using the internet or similar communication protocols.

In some embodiments as illustrated in FIG. 2, the electronic processor 205 is remotely connected to the electrical device 235 for which authorized access is sought via a telecommunication system 250. As a non-limiting example, electronic processor 205 can be part of a first computer 255 (e.g., a server computer hosting an authentication access system 200), and the electrical device 235 can be a second computer (e.g., second server computer hosting banking software user is trying to access via the internet using a user interface device 220 configured as a personnel computer or mobile communication device). As discussed in the context of FIG. 1, it is desirable for the system 200 to be configure implement secure communication protocol between physically separated processors 205, user interface devices 220 and electrical devices 235. Such secure communication protocols can include key exchange identifier that includes an encryption of digital representations of the access entry string and the one or more temporal or physical properties.

Figure 3:
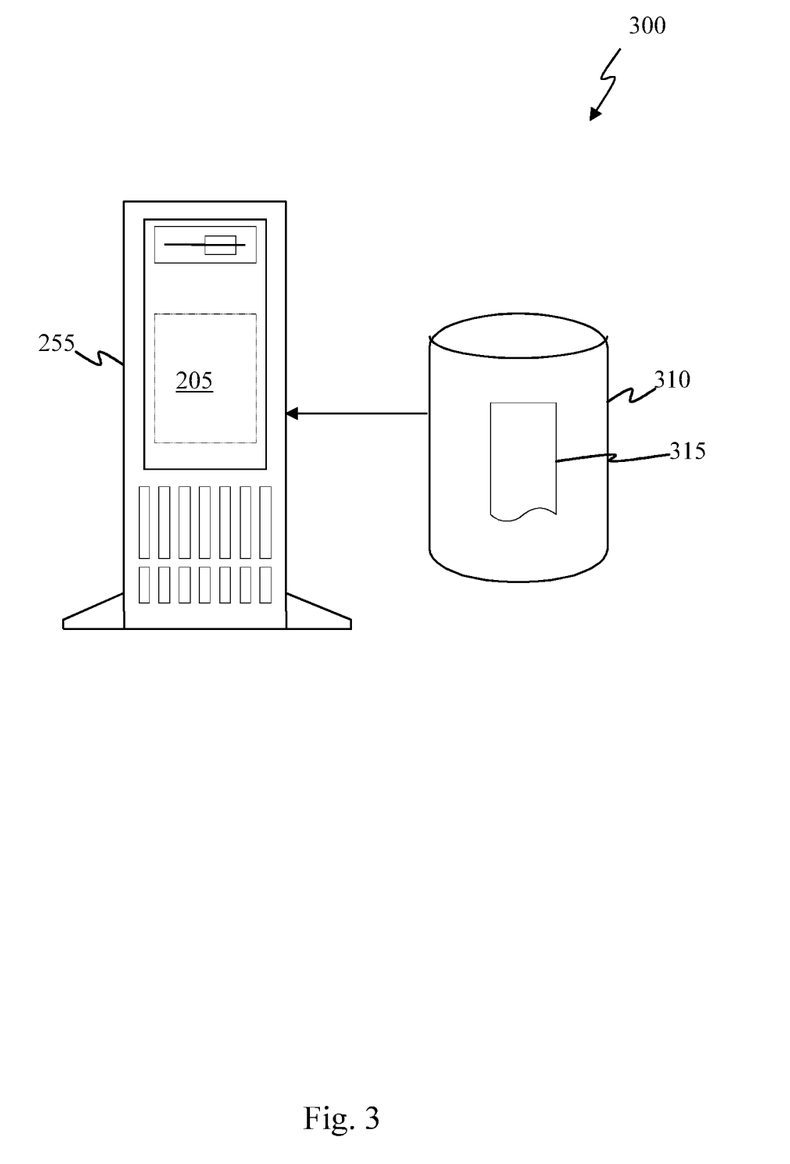
FIG. 3 illustrates a block diagram of an access authentication tool constructed according to the principles of the present disclosure.

Another embodiment is an access authentication tool. FIG. 3 illustrates a block diagram of an access authentication tool 300 constructed according to the principles of the present disclosure.

The tool 300 comprises a non-transitory electronic processor-readable medium 310 (e.g., a computer disk, or similar media described elsewhere herein) for embodying a program for inputting to an electronic processor 205 (e.g., a computer processor or other processors as described elsewhere herein housed in a computer 255). The tool 300 also comprises a program 315 (e.g., a series of electronic instructions such as computer code or other machine readable instructions) embodied in the electronic processor-readable for causing the electronic processor 205 to implement an access authentication program.

In various embodiments of the tool 300, the program 315 can include instructions to cause the processor 205, and in some cases, user interface device 220 and electrical device 235, to execute the method 100 and implement the system 200 described in the context of FIGS. 1-2.

For instance, with continuing reference to FIGS. 1 and 2, the program 315 can cause the electronic processor 205 to comparing one or more patterns of temporal or physical properties associated with an access entry string, to a non-transitory electronic profile data base 210 of ranges of the corresponding patterns, recorded from previously approved access entry strings, in accordance with step 105. The program 315 can cause the electronic processor 205 to approve the access entry string if the one or more patterns falls within the respective range of the corresponding patterns in the profile data base 210, in accordance with step 107. The program 315 can cause the electronic processor 205 deny the access entry string if the one or more patterns falls outside the respective range of the corresponding patterns in the profile data base 210 in accordance with step 110.

Similarly, the program 315 can cause the electronic processor 205 to perform any of the other steps attributed to the electronic processor 205 as described in the context of FIGS. 1 and 2.

Embodiments of the program 315 can similarly be implemented on the user interface device 220 or electrical device 230, or, on different electronic processors controlling such devices, 220, 230 to perform any of the steps attributed to these devices 220, 230 as described in the context of FIGS. 1 and 2.

Those skilled in the art to which this application relates will appreciate that other and further additions, deletions, substitutions and modifications may be made to the described embodiments.

What is claimed is:

1. A method of authenticating access to an electrical device, comprising:
   comparing, at an electronic processor, one or more patterns of temporal or physical properties, associated with an access entry string, to a non-transitory electronic profile data base of ranges of the corresponding patterns, from previously approved access entry strings; and either:
   approving, at the electronic processor, the access entry string, if the one or more patterns falls within the respective range of the corresponding patterns in the profile data base, or,
   denying, at the electronic processor, the access entry string if the one or more patterns falls outside the respective range of the corresponding patterns in the profile data base wherein, the patterns of physical properties includes both of:
   an average fingertip temperature measured while inputting all or a portion of the access entry string into a user interface device of the electrical device, and,
   an ambient temperature in the vicinity of a geolocation of the electrical device at the time the access entry string was provided.

2. The method of claim 1, wherein the access entry string is one or more of a characteristic string of symbols or biometric identifier.

3. The method of claim 1, further including:
   receiving, at a user interface device, the one or more patterns of temporal or physical properties associated with the access entry string;
   converting, at the user interface device, the patterns of received temporal or physical properties into electrical signals; and
   transmitting, from the user interface to the electronic processor, the electrical signals corresponding to the patterns of received temporal or physical properties.

4. The method of claim 1, further including either:
   sending from the electronic processor, upon approving the access entry string, an approved access signal to one or both of a user interface device where the access entry string was submitted, or, to an electrical device for which access is sought, or,
   sending from the electronic processor, upon denying access, a denied access signal to one or both of a user interface device where the access entry string was inputted, or, to the electrical device for which access is sought.

5. The method of claim 4, wherein the denied access signal includes instructions to the user interface device to prompt for additional security information to be supplied.

6. The method of claim 1, wherein one of the temporal properties includes a total time to input all or a portion of the access entry string.

7. The method of claim 1, wherein one of the physical properties includes total fingertip pressure applied while inputting all or a portion of the access entry string.

8. The method of claim 1, wherein the fingertip temperature is measured while inputting the access entry string into a touch screen of the user interface device.

9. The method of claim 1, wherein the geolocation at the time the access entry string was provided is determined by a global positioning system of the user interface device, and, the average fingertip temperature is compared to a one of the non-transitory electronic profile data bases of average fingertip temperatures that corresponds to a range of ambient temperatures that the ambient temperature, at the time the access entry string was provided, falls within.

10. The method of claim 1, wherein the ranges of the patterns of the corresponding one or more temporal or physical properties is calculated, at the electronic processor, from a predefined number of most recent ones of the previously approved access entry string.

11. The method of claim 1, wherein the range of each of the corresponding one or more temporal or physical properties recorded in the profile database is calculated, at the electronic processor, from the previously approved access entry strings received over a predefined most recent time period.

12. The method of claim 1, wherein the range of each of the corresponding one or more temporal or physical properties recorded in the profile database, calculated at the electronic processor, corresponds to a predefined multiple of a standard deviation above and below an average of a predefined number of designated ones of the previous entry strings received from the approved user.

13. A system for authenticating access to an electrical device, comprising:
    an electronic processor, configured to:
    compare one or more patterns of temporal or physical properties, associated with an access entry string, to a non-transitory electronic profile data base of ranges of the corresponding patterns, recorded from previously approved access entry strings; and either:
    approve the access entry string if the one or more patterns falls within the respective range of the corresponding patterns in the profile data base, or,
    deny the access entry string if the one or more patterns falls outside the respective range of the corresponding patterns in the profile data base wherein, the patterns of physical properties includes both of:
    an average fingertip temperature measured while inputting all or a portion of the access entry string into a user interface device of the electrical device, and,
    an ambient temperature in the vicinity of a geolocation of the electrical device at the time the access entry string was provided.

14. The system of claim 13, further including a user interface device configured to:
    receive the one or more patterns of temporal or physical properties associated with the access entry string;
    convert the received patterns of temporal or physical properties into electrical signals; and
    transmit the electrical signals to the electronic processor.

15. The system of claim 14, wherein the user interface device and the electronic processor are part of an entry access device.

16. The system of claim 14, wherein the user interface device is remotely connected to the electronic processor via a telecommunication system.

17. The system of claim 13, including a user interface device configured to either:
    present an approval indicator upon receiving an electrical approval signal sent from the electronic processor if the access entry string is approved by the electronic processor, or
    present a denial indicator upon receiving an electrical denial signal sent from the electronic processor if access is denied by the electronic processor.

18. The system of claim 13, further including an electrical device configured to either:
    allow user access upon receiving an approval signal sent from the electronic processor if access is approved by the electronic processor, or
    deny user access upon receiving an denial signal sent from the electronic processor if access is denied by the electronic processor.

19. The system of claim 18, wherein the electronic processor is remotely connected to the electrical device for which authorized access is sought via a telecommunication system.

20. An access authentication tool, comprising:
    a non-transitory electronic processor-readable medium for embodying a program for inputting to an electronic processor; and
    a program embodied in the electronic processor-readable medium for causing the electronic processor to implement an access authentication program, including:
    comparing one or more patterns of temporal or physical properties associated with an access entry string, to a non-transitory electronic profile data base of ranges of the corresponding patterns, recorded from previously approved access entry strings; and either:
    approving the access entry string, if the one or more patterns falls within the respective range of the corresponding patterns in the profile data base, or,
    denying the access entry string if the one or more patterns falls outside the respective range of the corresponding patterns in the profile data base wherein, the patterns of physical properties includes both of:
    an average fingertip temperature measured while inputting all or a portion of the access entry string into a user interface device of the electrical device, and,
    an ambient temperature in the vicinity of a geolocation of the electrical device at the time the access entry string was provided.

\* \* \* \* \*